United States Patent [19]

Quadbeck-Seeger et al.

[11] 3,923,825
[45] Dec. 2, 1975

[54] PRODUCTION OF ISOOXAZOLE

[75] Inventors: Hans-Juergen Quadbeck-Seeger, Ludwigshafen; Willibald Schoenleben, Heidelberg; Dieter Schneider, Edingen, all of Germany

[73] Assignee: BASF Aktiengesellschaft, Ludwigshafen, Rhine, Germany

[22] Filed: Feb. 27, 1974

[21] Appl. No.: 446,330

[30] Foreign Application Priority Data
Mar. 1, 1973 Germany............................ 2310185

[52] U.S. Cl. .......................................... 260/307 H
[51] Int. Cl.² ...................................... C07D 261/08
[58] Field of Search ................................ 260/307 H

[56] References Cited
UNITED STATES PATENTS 3,391,154  7/1968  Hollander ...................... 260/307 H
3,790,591  2/1974  Albrecht et al. ................ 260/307 H

*Primary Examiner*—Raymond V. Rosh
*Attorney, Agent, or Firm*—Johnston, Keil, Thompson & Shurtleff

[57] ABSTRACT

Isooxazole is produced by reaction of a vinyl ether with an acid halide and a formamide and reaction of the reaction mixture with hydroxylamine. The product is a starting material for the production of dyes and pest control agents.

19 Claims, No Drawings

PRODUCTION OF ISOOXAZOLE

The invention relates to a process for the production of isooxazole by reaction of a vinyl ether with an acid halide and a formamide followed by reaction of the reaction mixture thus obtained with hydroxylamine.

Isooxazole can be prepared by reaction of malonic dialdehyde diacetate with hydroxylamine hydrochloride (Gazz. Chim. Ital., 85 (1955), 34). Suitable starting materials for the production of isooxazole and its derivatives also include propargylaldehyde (Chem. Ber., 36 (1903), 3665), acylacetylene compounds (Compt. rend., 137 (1903), 795) and dimethylaminoacrolein (Chem. Ber., 93, (1960), 1210). The isolation of the isooxazole is carried out by way of the sparingly soluble cadmium complex.

It is an object of this invention to provide a novel process for producing isooxazole in a good yield and high purity in a simpler and more economical manner.

We have found that isooxazole is obtained advantageously by reacting a vinyl ether of the formula (I):

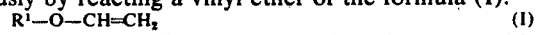

in which $R_1$ is an aliphatic radical, in a first stage with an acid halide of phosphorous acid, phosphoric acid, carbonic acid, oxalic acid, sulfurous acid or sulfuric acid and a formamide of the formula (II):

in which $R^2$ is an aliphatic or aromatic radical, $R^3$ is an aliphatic or aromatic radical or $R_2$ and $R^3$ together with the adjacent nitrogen atom may be members of a heterocyclic ring and reacting the reaction mixture thus formed with hydroxylamine in a second stage.

When vinyl ethyl ether, dimethyl formamide and phosgene are used the reaction may be represented by the following equation:

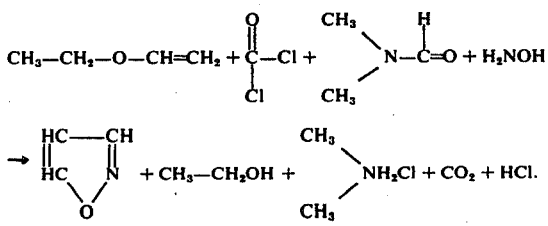

The process of the invention starts from more easily accessible starting materials than the prior art methods and gives isooxazole in a good yield and high purity in a simpler and more economical manner. The advantageous results are surprising having regard to the fact that the two-stage process is carried out in a single vessel with several starting materials so that the formation of a difficultly separable mixture of numerous heterogeneous reaction products was to be expected.

Starting material (I) is reacted in the first stage with starting material (II) and an acid halide, preferably an acid bromide and particularly an acid chloride of phosphorous acid, phosphoric acid, carbonic acid, oxalic acid, sulfurous acid or sulfuric acid, conveniently oxalyl chloride, oxalyl bromide, phosphorus trichloride, phosphorus oxychloride, phosphorus tribromide, sulfuryl chloride and preferably thionyl chloride or phosgene. The acid halide is used in the stoichiometric amount or in excess, conveniently in an amount of from one mole to eight moles of acid halide per mole of starting material (I) and the starting material (II) in relation to starting material (I) in a stoichiometric amount or an excess and advantageously in an amount of from one mole to four moles of starting material (II) to one mole of starting material (I).

Preferred starting materials (II) are those in whose formulae $R_2$ is alkyl of one to four carbon atoms or phenyl, $R^3$ is alkyl of one to four carbon atoms or phenyl, or $R^2$ and $R^3$ together with the adjacent nitrogen atom are members of a five-membered or six-membered heterocyclic ring which may contain another nitrogen atom or an oxygen atom. The said radicals and rings may bear groups and/or atoms which are inert under the reaction conditions, for example alkyl of one to four carbon atoms, alkoxy of one to four carbon atoms, or chloro as substituents.

Examples of formamides which are suitable as starting material (II) are: formamide, formanilide, N-formylpiperidine, N-formylpyrrolidine, N-formylmorpholine, N,N-diethylformamide, N-isobutylformamide, N-methylformamide, form-(p-chloro)-anilide and particularly N-methylformanilide or N,N-dimethylformamide.

The acid halide and starting material (II) may also first be reacted together in the process of the invention so that adducts known for the Vilsmeier method are prepared. These adducts, for example when phosphorus oxychloride is used (Houben-Weyl, loc. cit., page 30) may be represented as follows:

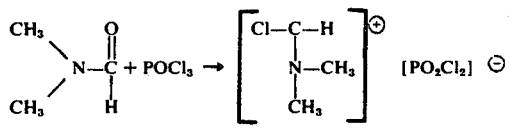

The adduct need not necessarily have the structure shown, nor is the formation of an adduct a prerequisite for the operability of the process of the invention. The reaction product of acid halide and starting material (II) may also be isolated by concentrating the reaction mixture of the two components and used instead of the said two components as starting material for reaction in the first stage of the process with starting material (I).

Preferred starting materials (I) are those in whose formulae $R^1$ is alkyl of one to eight and particularly of one to four carbon atoms. The said radicals may bear groups and/or atoms which are inert under the reaction conditions, for example alkyl of one to four carbon atoms, alkoxy of one to four carbon atoms or chlorine atoms. Examples of starting materials (I) are: isobutyl vinyl ether, methyl vinyl ether, ethyl vinyl ether, tert.-butyl vinyl ether, isopropyl vinyl ether, n-hexyl vinyl ether, n-octyl vinyl ether, n-propyl vinyl ether and butyl vinyl ether.

The first stage of the reaction is carried out as a rule at a temperature of from $-10°$ to $+75°C$ and preferably from $30°$ to $75°C$ at atmospheric or superatmospheric pressure, continuously or batchwise. Particularly in the case of gaseous acid halides use may be made of organic solvents which are inert under the reaction conditions, for example cyclic carboxamides such as N-methylpyrrolidone; hydrocarbons such as cyclohexane, benzene or toluene; chlorohydrocarbons such as chloroform or carbon tetrachloride; ethers such as tetrahydrofuran, dioxane or glycol dimethyl ether; or appropriate mixtures. The amount of solvent is generally from 10 to 1000% by weight based on starting material (I). In many cases an appropriate starting material (II), for example formamide, may be used as the reaction medium. A reaction period of from one to eight and preferably from two to three hours is maintained in the first stage.

The reaction product formed may be isolated for example by distilling off the solvent and supplied as starting material to the second stage of the process. For the sake of simple and economical operation however the reaction mixture is as a rule reacted immediately with the hydroxylamine. A stoichiometric amount, a deficiency or an excess of hydroxylamine, preferably from 0.5 mole to 6 moles and particularly from 0.75 mole to 3 moles of hydroxylamine based on starting material (I) is suitable. The second stage of the reaction is carried out as a rule at a temperature of from 75° to 150°C and preferably from 90° to 110°C at atmospheric or superatmospheric pressure, continuously or batchwise. Together with the hydroxylamine it is convenient to use an organic solvent which is inert under the reaction conditions, advantageously an aliphatic monoalcohol or dialcohol, for example methanol, ethanol, n-propanol, n-butyl, ethylene glycol, propylene glycol, isobutanol, tert.-butanol and isopropanol; and appropriate mixtures. The amount of solvent is generally from 10 to 1000% by weight based on hydroxylamine. The hydroxylamine is used as a rule in the form of its salts. Examples of suitable salts are the chloride, sulfate, formate and acetate of hydroxylamine. The reaction period for the second stage is conveniently from one hour to six hours and preferably from two to four hours.

The reaction may be carried out as follows: a mixture of acid halide and starting materials (I) and (II) with or without a solvent is reacted at the said reaction temperature for the reaction period. Hydroxylamine and advantageously one of the said alkanols or glycols are then added, the mixture is allowed to react under the said conditions of reaction temperature and reaction period and then the end product is isolated by a conventional method, for example by extraction with one of the said solvents.

Isoxazole and solvent are however separated from the mixture as a rule by distillation. This preferred method is advantageous because the isooxazole formed is capable of being distilled off from the strongly acid reaction solution with the solvent serving as reaction medium which is an alkanol or glycol.

Alkanols and glycols which boil at below 250°C and particularly those mentioned above, have proved to be particularly advantageous for this separation. Isooxazole is separated in this way in a pure form and the solutions obtained may be used immediately for further syntheses without isolation of the end product; thus for example N-phenyl-5-aminopyrazole may be obtained in a yield of more than 80% by the method described in German Laid-Open Specification (DOS) No. 2,044,654. This method moreover has the advantage for reactions of isooxazole with strong bases to form cyanoacetaldehyde (which is a widely used intermediate) that the acids formed in the reaction medium do not have to be neutralized.

The isooxazole which can be prepared by the process of the invention is a valuable starting material for the production of dyes and pesticides. The abovementioned publications may be referred to concerning applications.

The following Examples illustrate the invention. The parts specified in the Examples are by weight.

EXAMPLE 1

160 parts of phosgene is passed within one hour into 111 parts of dimethylformamide and 192 parts of vinyl n-hexyl ether, the temperature being kept at 60°C by cooling. The mixture is stirred for two hours at from 40° to 50°C, 100 parts of ethylene glycol and 70 parts of hydroxylamine hydrochloride are added and the mixture is kept for three hours at 100°C. Volatile constituents are distilled off up to a bath temperature of 160°C and a solution is obtained which contains 56 parts of isooxazole (81% of theory based on hydroxylamine hydrochloride). Isooxazole is isolated from the solution by fractional distillation; the boiling point is 95°C at standard pressure.

EXAMPLE 2

70 parts of phosgene is passed into 70 parts of carbon tetrachloride at from 0° to 5°C and then 37 parts of dimethylformamide is added over forty-five minutes. 42 parts of vinyl isobutyl ether is then added and the mixture is kept at 35°C for two hours. The reaction mixture separates into two phases. The upper phase is separated and heated under reflux with 50 parts of ethanol and 35 parts of hydroxylamine hydrochloride for three hours. All the volatile constituents are then distilled off until the bath temperature reaches 180°C. A solution is obtained which according to gas chromatographic analysis contains 26 parts of isooxazole (75% of theory).

EXAMPLE 3

150 parts of phosgene is passed within sixty minutes into 130 parts of vinyl isobutyl ether and 96 parts of dimethylformamide, the temperature rising from 25° to 70°C. The whole is stirred for another two hours at 70°C and then 100 parts of isobutanol and 70 parts of hydroxylamine hydrochloride is added and the mixture is kept for three hours under reflux (100°C). As described in Example 1 a solution is obtained containing 53 parts (76% of theory) of isooxazole (according to gas chromatographic analysis).

EXAMPLE 4

160 parts of phosgene is passed into 111 parts of dimethylformamide and 110 parts of vinyl ethyl ether, the temperature rising to 60°C. The mixture is stirred for two hours at from 40° to 50°C, 100 parts of isobutanol and 70 parts of hydroxylamine hydrochloride are added and the mixture is heated under reflux for three hours. After processing as described in Example 1 a solution is obtained which according to gas chromatographic analysis contains 62 parts (90% of theory) of isooxazole.

EXAMPLE 5

In the manner described in Example 4 the reaction is carried out using 100 parts of ethanol instead of isobutanol as solvent. 55 parts of isooxazole (80% of theory) is obtained in solution according to gas chromatographic analysis.

EXAMPLE 6

150 parts of phosgene is passed during seventy minutes into a mixture of 170 parts of N-formylpyrrolidone and 150 parts of vinyl isobutyl ether, the temperature thus rising from 25° to 70°C. The mixture is kept at from 40° to 50°C for another three hours. 100 parts of isobutanol and 70 parts of hydroxylamine hydrochloride are added and the mixture is heated under reflux for three hours. The reaction mixture is worked up as described in Example 1 and gives a solution which according to gas chromatographic analysis contains 58 parts of isooxazole (84% of theory).

EXAMPLE 7

70 parts of carbon tetrachloride and 73 parts of dimethylformamide are placed in a vessel and 120 parts of thionyl chloride is added at 0° to 10°C. The mixture is stirred for thirty minutes at 10°C and then 100 parts of vinyl isobutyl ether is slowly added. The reaction period for the first stage is five hours in all. The mixture separates into two layers. The upper phase is heated with 100 parts of isobutanol and 53 parts of hydroxylamine hydrochloride for three hours under reflux (100°C). As described in Example 1 31 parts (59% of theory) of isooxazole is obtained in solution according to gas chromatographic analysis.

EXAMPLE 8

The reaction is carried out as described in Example 4 using 100 parts of ethylene glycol as solvent. 56 parts (81% of theory) of isooxazole is obtained in solution according to gas chromatographic analysis.

EXAMPLE 9

70 parts of carbon tetrachloride and 135 parts of N-methylformanilide are placed in a vessel and 153 parts of phosphorus oxychloride is added at 0° to 10°C. The mixture is stirred for an hour at 10°C and then 86 parts of n-propyl vinyl ether is slowly added at a temperature of 35° to 45°C. The mixture is heated for three hours at 60°C and then cooled. The mixture separates into two phases. In the manner described in Example 1 a solution of 32 parts of isooxazole (60% of theory) is obtained.

We claim:

1. A process for the production of isooxazole wherein in a first stage a vinyl ether of the formula (I):

$$R^1 - O - CH = CH_2 \quad (I)$$

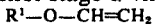

in which $R^1$ is alkyl of 1 to 8 carbon atoms, or said alkyl group substituted by alkoxy of 1–4 carbon atoms or by chlorine, is reacted at a temperature of −10° to +75°C. with an acid halide of phosphorous acid, phosphoric acid, carbonic acid, oxalic acid, sulfurous acid or sulfuric acid and a formamide of the formula (II):

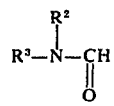

$$(II)$$

in which $R^2$ and $R^3$ individually are alkyl of 1 to 4 carbon atoms or phenyl; or $R^2$ and $R^3$ together with the adjacent nitrogen atom form heterocyclic ring selected from the group consisting of pyrrolidino, piperidino, morpholino, or pyrrolidone, which may contain another nitrogen atom or an oxygen atom, or in which said alkyl group, said phenyl group or said heterocyclic ring of $R^2$ and $R^3$ is substituted by alkyl of 1 to 4 carbon atoms, alkoxy of 1 to 4 carbon atoms, or chlorine; and in a second stage the reaction mixture thus formed is reacted at a temperature of 75°–150°C. with hyroxylamine.

2. A process as claimed in claim 1 wherein the reaction is carried out with from 1 to 8 moles of acid halide per mole of starting material (I).

3. A process as claimed in claim 1 wherein the reaction is carried out with from 1 mole to 4 moles of starting material (II) per mole of starting material (I).

4. A process as claimed in claim 1 wherein the reaction in the first stage is carried out at a temperature of from 30° to 75°C.

5. A process as claimed in claim 1 wherein the reaction in the first stage is carried out in the presence of an organic solvent which is inert under the reaction conditions.

6. A process as claimed in claim 1 wherein the reaction in the first stage is carried out in the starting material (II) as the reaction medium.

7. A process as claimed in claim 1 wherein the reaction in the second stage is carried out with from 0.5 mole to 6 moles of hydroxylamine based on starting material (I).

8. A process as claimed in claim 1 wherein the reaction in the second stage is carried out with from 0.75 mole to 3 moles of hydroxylamine per mole of starting material (I).

9. A process as claimed in claim 1 wherein the reaction in the second stage is carried out at a temperature of from 90° to 110°C.

10. A process as claimed in claim 1 wherein the reaction in the second stage is carried out in the presence of an alkanol or glycol which boils at below 250°C and the isooxazole and solvent are separated from the mixture by distillation.

11. A process as claimed in claim 1 wherein in the first stage a vinyl ether of the formula (I) is reacted with oxalyl chloride, oxalyl bromide, phosphorus trichloride, phosphorus tribromide, sulfuryl chloride, thionyl chloride or phosgene and with a formamide of the formula (II).

12. A process as claimed in claim 1 wherein the reaction in the second stage is carried out in the presence of an alkanol or a glycol which boils below 250°C in an amount of from 10 to 1000% by weight of solvent based on hydroxylamine.

13. A process as claimed in claim 1 wherein in the first stage the vinyl ether of the formula (I) is reacted with an adduct of the acid halide and the formamide of the formula (II).

14. A process as claimed in claim 1 wherein hydroxylamine hydrochloride is added in the second stage to provide the hydroxylamine.

15. A process as claimed in claim 1 wherein $R^1$ denotes alkyl of 1 to 8 carbon atoms.

16. A process as claimed in claim 1 wherein $R^1$ denotes alkyl of 1 to 8 carbon atoms, and $R^2$ denotes alkyl of 1 to 4 carbon atoms, and $R^3$ denotes alkyl of 1 to 4 carbon atoms, phenyl or phenyl substituted by chlorine.

17. A process as claimed in claim 1 wherein said starting material (II) is N-formylpiperidine, N-formylpyrrolidine, N-formylmorpholine, or N-formylpyrrolidone.

18. A process as claimed in claim 12 wherein said alkanol or glycol is methanol, ethanol, n-propanol, n-butanol, ethylene glycol, propylene glycol, isobutanol, tert.-butanol, isopropanol, or mixtures thereof.

19. A process as claimed in claim 1 wherein said starting material (II) is N-methylformanilide or N,N-dimethylformamide.

* * * * *